United States Patent [19]

Curry

[11] 4,250,940
[45] * Feb. 17, 1981

[54] TIRE TREAD CUTTING MACHINE

[76] Inventor: Kenneth D. Curry, P.O. Box 1856, Hattiesburg, Miss. 39401

[*] Notice: The portion of the term of this patent subsequent to Mar. 20, 1996, has been disclaimed.

[21] Appl. No.: 954,726

[22] Filed: Oct. 25, 1978

Related U.S. Application Data

[63] Continuation-in-part of Ser. No. 851,966, Nov. 16, 1977, Pat. No. 4,144,923.

[51] Int. Cl.³ ............................................ B29H 21/08
[52] U.S. Cl. ..................................................... 157/13
[58] Field of Search .......................................... 157/13

[56] References Cited

U.S. PATENT DOCUMENTS

| | | | |
|---|---|---|---|
| 2,897,882 | 8/1959 | Barrett | 157/13 |
| 3,692,081 | 9/1972 | May et al. | 157/13 |
| 4,144,923 | 3/1979 | Curry | 157/13 |

Primary Examiner—James G. Smith
Attorney, Agent, or Firm—William A. Drucker

[57] ABSTRACT

The present tire cutting machine can rotatably support a wheel mounted and inflated tire with the tread thereof facing one or the other of a groove cutter, and a rotatable siping blade assembled with a feeler. The tire can be driven from the wheel for cutting circumferential grooves, or can be driven by the siping cutter and/or a lead screw when siping. When the feeler and siping blade engage the tire, the feeler maintains the siping blade in proper relation to the tire tread for said siping blade to cut and move around the tire tread to effect minute lateral cuts or sipes in a section of the tire tread.

5 Claims, 13 Drawing Figures

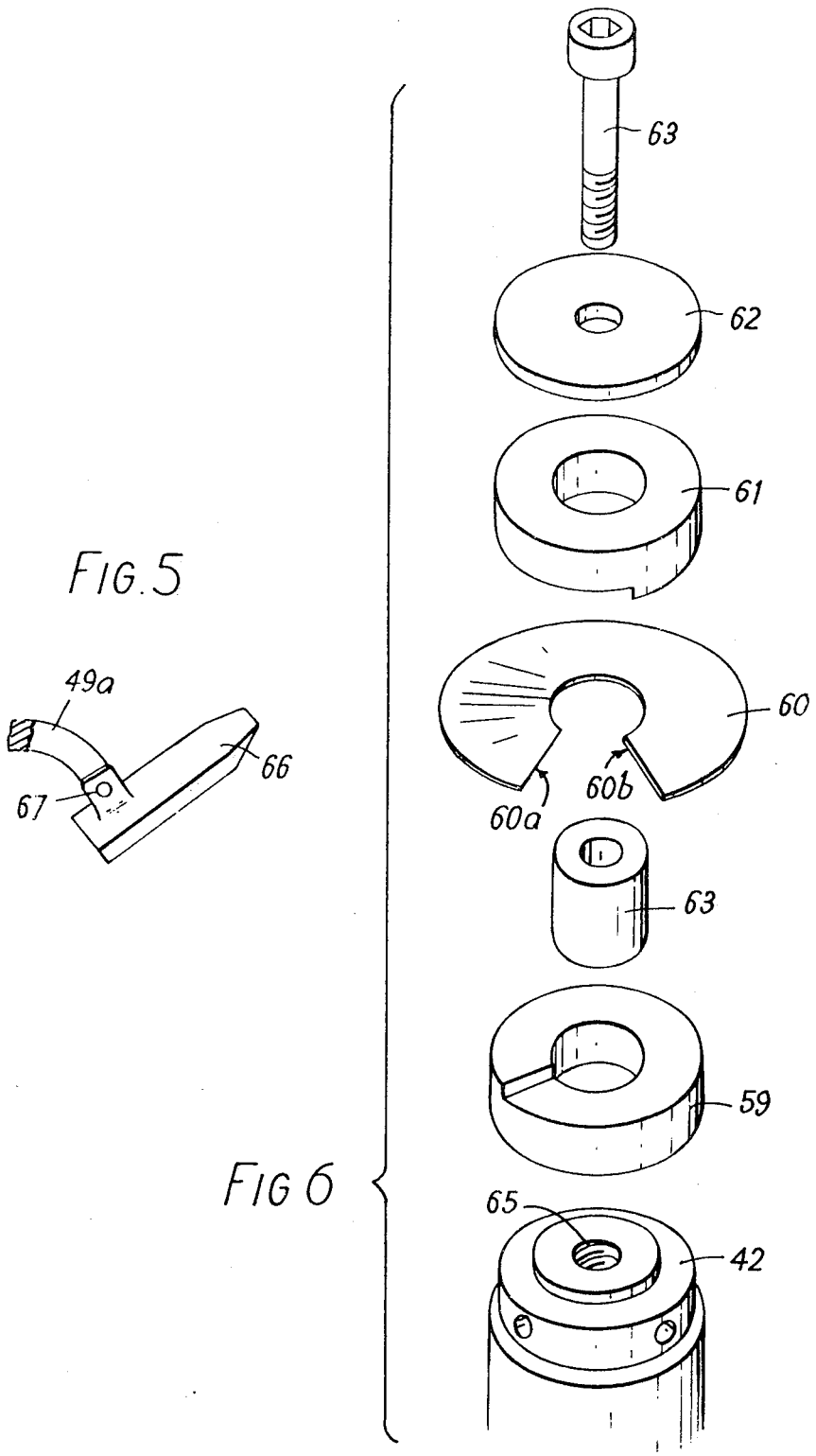

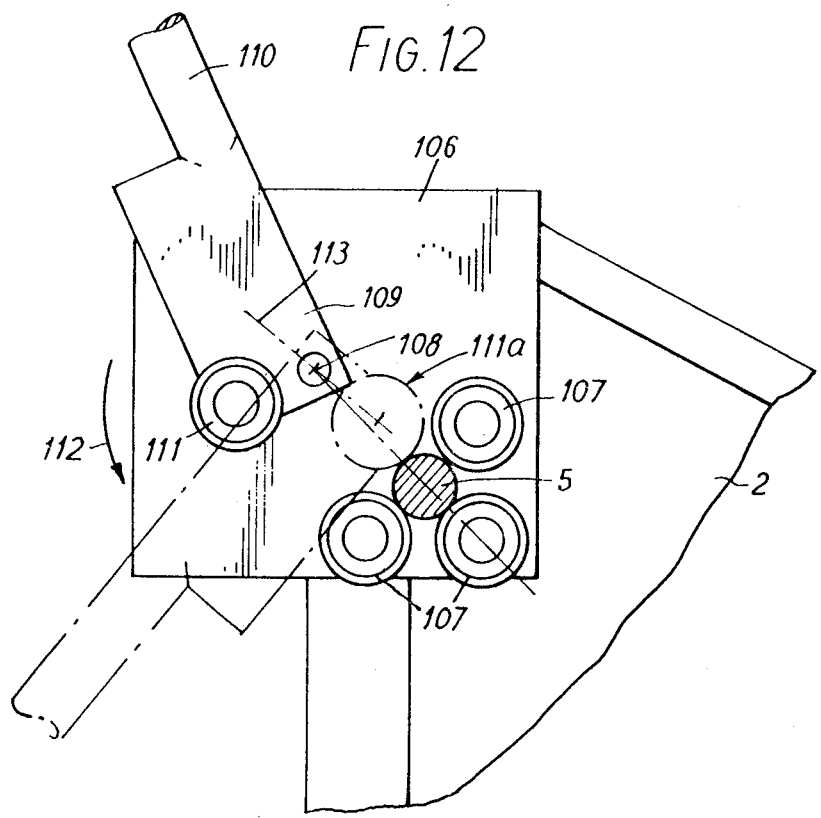
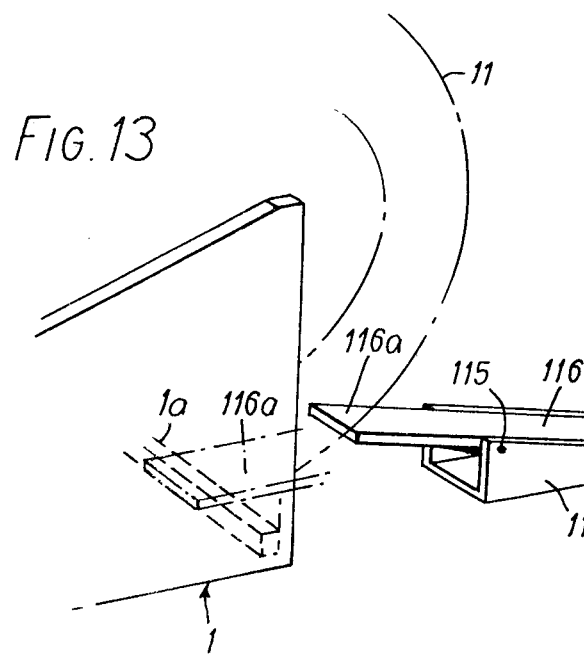

– 1 –

TIRE TREAD CUTTING MACHINE

This application is a continuation-in-part of my copending U. S. patent application Ser. No. 851,966 filed Nov. 16, 1977 now U.S. Pat. No. 4,144,923.

The present invention is concerned with a machine for cutting the tread of tires, as by circumferential grooving and/or siping.

OBJECTS OF THE INVENTION

A first object of the present invention is to provide a machine for rotatably supporting a wheel mounted and inflated tire, and for cutting a circumferential groove in said tire by relative rotary movement between the tire and a groove cutter.

A second object of the invention is to provide a machine for rotatably supporting a wheel mounted and inflated tire and to effect a series of sipes in the circumference of the tire tread and in a short period of time.

A third object of the invention is to provide a machine for rotatably supporting a wheel mounted and inflated tire, the machine having a groove cutter and a rotatable siping cutter which are relatively displaceable one respect to the other such that the machine may be utilised both for cutting a circumferential groove in the tire by relatively rotary movement between the tire and the groove cutter, and for effecting a series of sipes in the circumference of the tire tread.

SUMMARY OF THE INVENTION

According to a first aspect of the invention, a machine, for cutting circumferential grooves in a tire tread, comprises a support, means on said support for supporting a tire rotatable about an axis, a mounting carried by said support, said mounting and said tire support means being movable relatively towards and away from each other radially by said axis, a cutter on said mounting, and drive means to act between said support and said tire for rotating said tire relative to said cutter.

According to a second aspect of the invention, a tire tread siping machine comprises a support, means on said support for supporting a tire rotatable about an axis, a mounting carried by said support, said mounting and said tire support means being movable relatively towards and away from each other, radially of said axis, and a siping cutter rotatably carried by the mounting.

According to a third aspect of the invention, a machine, for cutting a tire tread, comprises a support, means on said support for supporting a tire rotatable about an axis, a mounting carried by said support, said mounting and said tire support means being movable relatively towards and away from each other radially of said axis, a rotatable siping cutter on said mounting, and a groove cutter on said mounting, said siping cutter and said groove cutter being relatively movable for presenting a selected one of said cutters to the tread of a tire on said supporting means.

Further objects of the invention will be partly pointed out in and partly obvious from the following detailed description with respect to the accompanying drawings.

BRIEF DESCRIPTION OF THE DRAWINGS

In the accompanying drawings:

FIG. 5 is a side elevation of an alternative form of feeler;

FIG. 6 is a perspective view, with the elements shown in axially separated condition, of a cutter head assembly.

FIG. 12 is a partial section and elevation to show a modified form of releasable and lockable mounting for the shaft carrying the tired wheel;

FIG. 13 is a partial perspective elevation to show a ramp used for facilitating mounting of the tired wheel in the machine.

DESCRIPTION OF THE PREFERRED EMBODIMENTS

Figure 1:
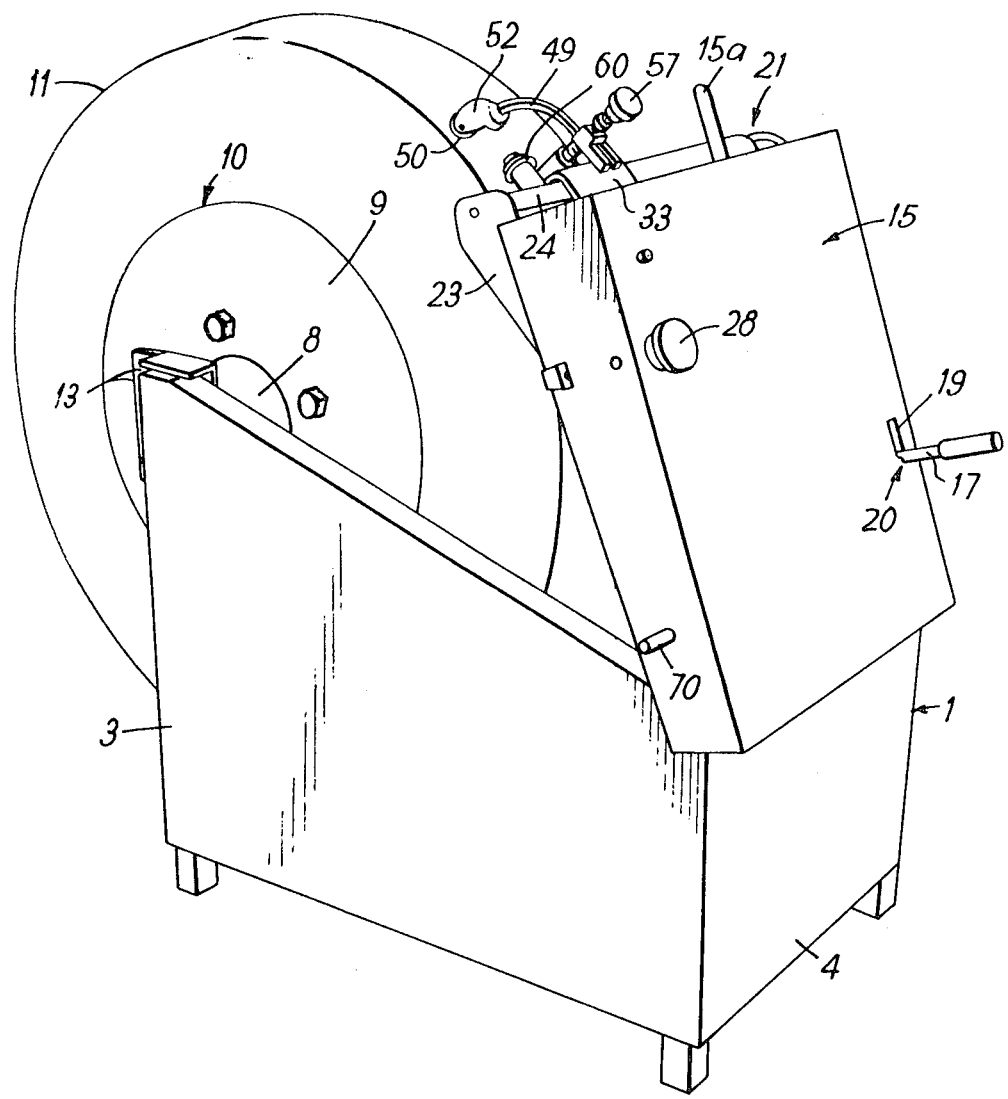
FIG. 1 is a perspective view of a machine adapted for siping only.

The machine comprises a stationary support 1 having opposed spaced parallel side walls 2, 3, and a front wall 4, the rear end being open. Carried by the side walls 2, 3, adjacent the open end and at the upper part of the support there is provided a transverse shaft 5 which sits on blocks 6 so as to be readily removable and replaceable. The shaft 5 carries a frusto-conical sleeve 7 which serves to receive and center a mandrel 8 bolted to the hub 9 of a vehicle wheel 10 having a tire 11. The mandrel is adjustable along the shaft 5 so that the wheel 10 may be positioned with its axial plane of symmetry X-X′ substantially centrally in the support. For siping purposes only, the wheel and tire are freely rotatable. On the side walls 2, 3, there are provided flanges 12, 13, which are inclined so as to act as guide for facilitating insertion of the wheel into the support.

Figure 2:
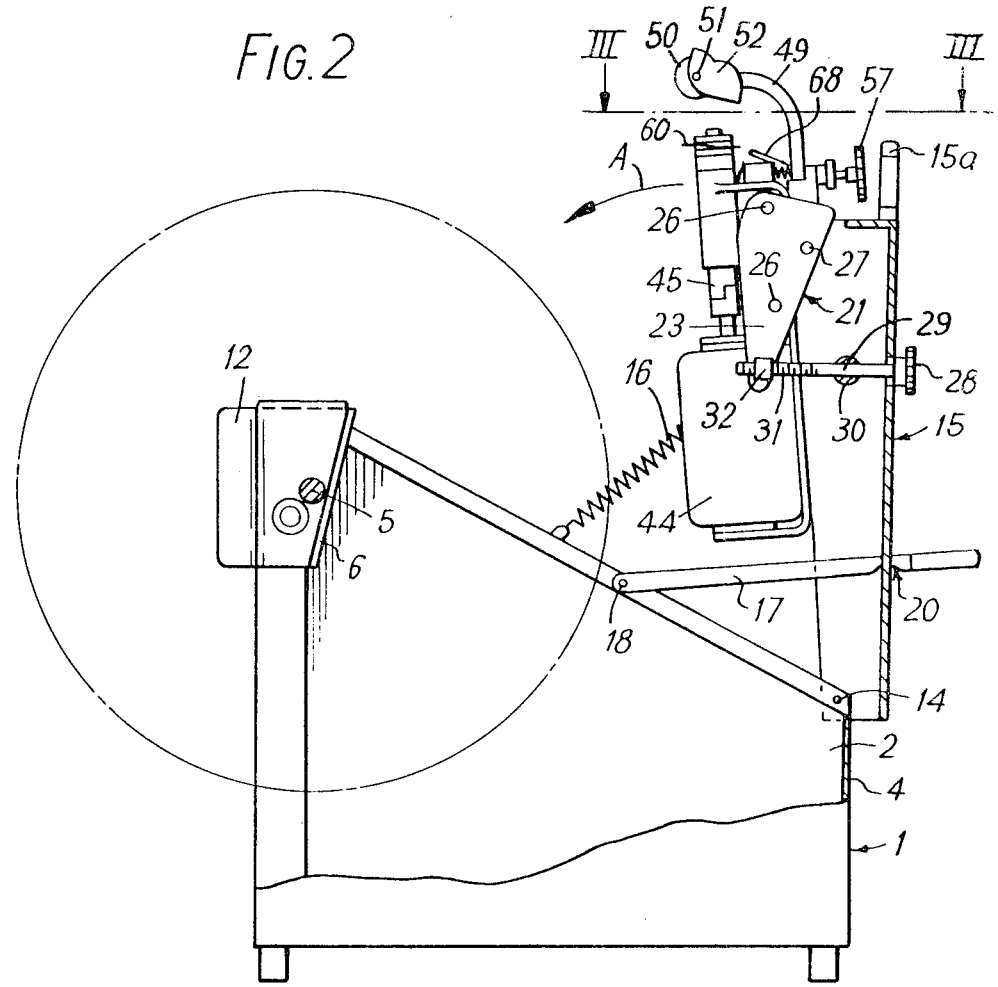
FIG. 2 is a central longitudinal section, with parts shown broken away to reveal internal details.
Figure 3:
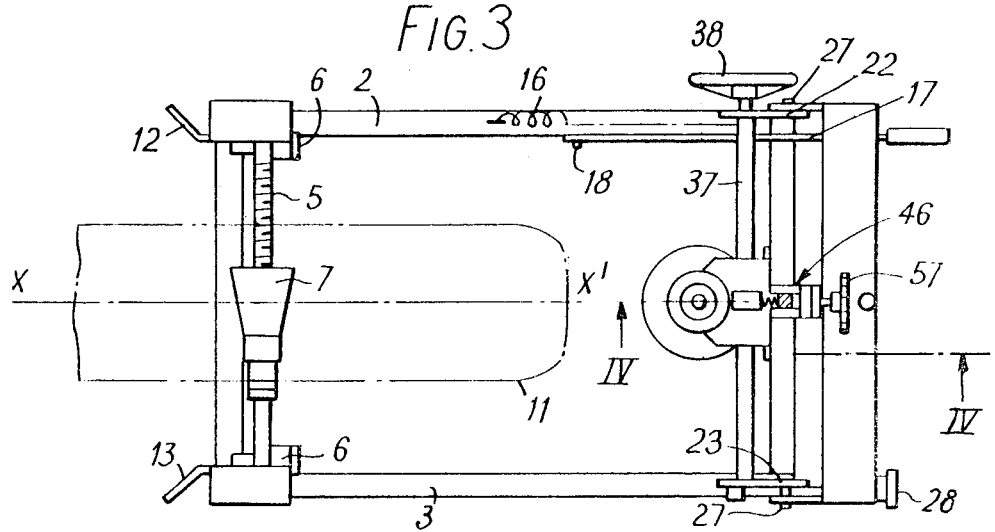
FIG. 3 is a horizontal section taken at the line III—III of FIG. 2.

On the support, adjacent the upper end of the front wall 4, there is provided on each side wall 2, 3, a pivot 14 carrying a mounting indicated generally by reference numeral 15. A spring 16 is connected at one end to the side wall 2 and at the other end to the mounting 15 to urge the mounting in the direction of the arrow "A" in FIG. 2. The mounting may be releasably latched in a non-operative position, seen in FIG. 2, by means of a latching lever 17, pivoted on the side wall 2 at 18 and protruding through an opening 19 in the mounting 15, the lever 17 having a notch 20 in which the wall of the mounting 15 can be retained. When the lever 17 is raised manually, the wall of the mounting is disengaged from the notch 20 and the mounting 15 is then moved by the spring 16 in the direction of the arrow "A".

On the mounting 15 there is carried a guide frame assembly denoted generally by reference numeral 21. The guide frame assembly comprises a pair of side plates 22, 23, which are rigidly connected in spaced parallel relationship by an upper slide tube 24 and a lower slide tube 25 which are secured to the side plates by bolts 26. The frame assembly as a whole is mounted on the mounting 15 by a respective pivot 27 at each side engaged through the side plate and wall portion of the mounting 15, and can be moved with the aid of a handle 15a. The frame assembly can be adjusted, about the axis of the pivots 27, to a desired angle by means of a handwheel 28 on a shaft 29 rotatable in a bearing 30 on the mounting 15 and having a threaded end portion 31 on which is threaded a sleeve 32 pivoted on the side plate 23.

Figure 4:
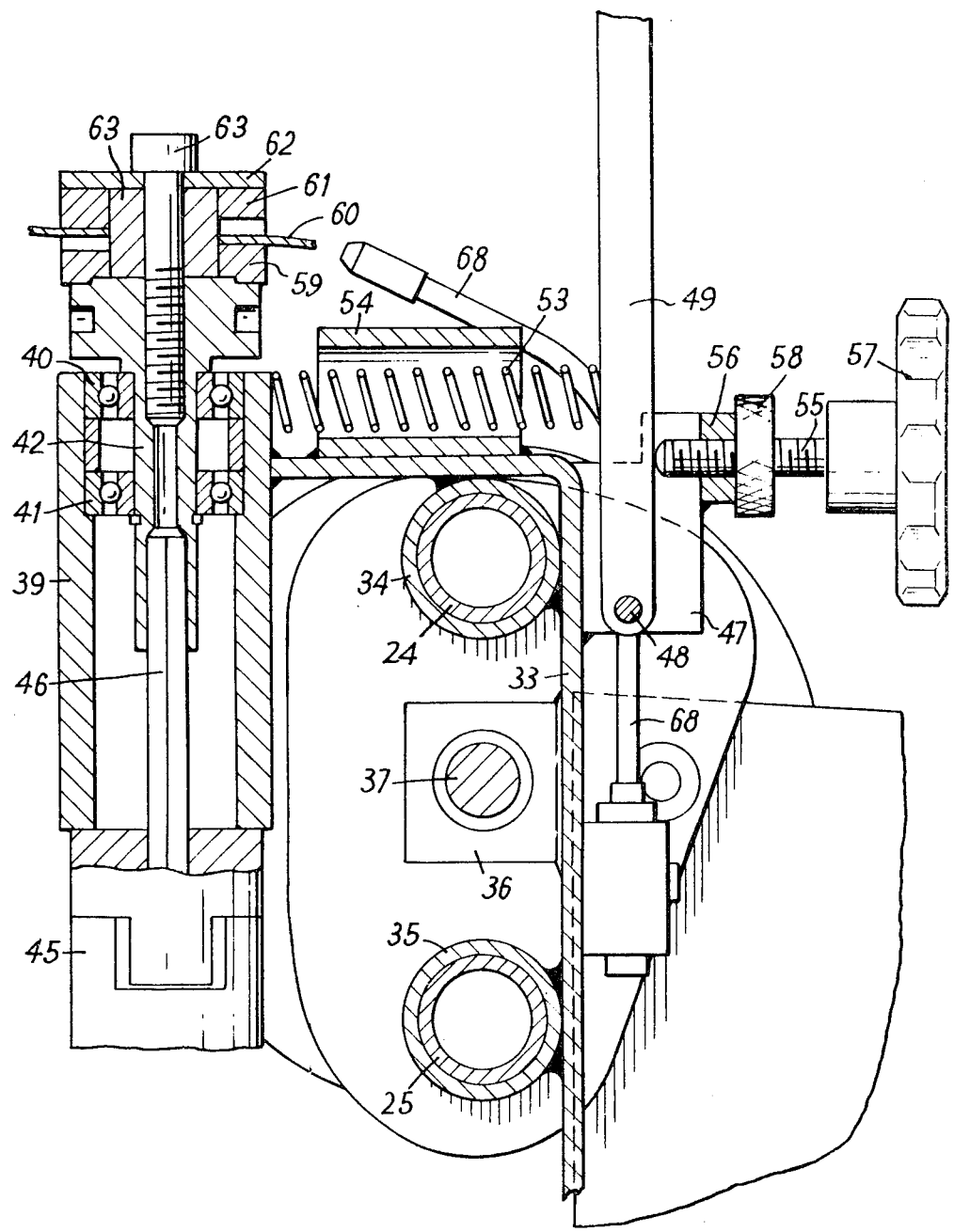
FIG. 4 is a scrap vertical section taken on the line IV—IV of FIG. 3.

On the upper and lower slide tubes 24, 25, there is carried an assembly of a rotary siping cutter, an electrical driving motor for the cutter, and an adjustable feeler for controlling depth of penetration of the cutter into the tire tread. Referring to FIG. 4, this assembly includes a bracket 33 on which are welded sleeves 34, 35 which respectively slide on the upper and lower slide tubes 24, and 25. For shifting the assembly along the slide tubes there is provided a block 36 which is secured to the bracket 33 and which is internally threaded and is engaged on a threaded lead screw 37 journalled in the side plates 22, 23 of the mounting 15. The lead screw 37 can be rotated manually by means of an external handwheel 38.

On the upper part of the bracket 33 there is welded a sleeve 39 having ball races 40, 41, for a cutter shaft 42 carrying a cutter 60 which will be described hereinbelow in greater detail with reference to FIG. 6. The lower part of the bracket 33 has secured thereon an electric motor 44 coupled through a dog clutch 45 to a shaft 46 secured in the cutter shaft 42.

On the guide frame assembly 21 there is mounted a feeler assembly which includes a block 47 welded on the bracket 33, a pivot 48 in the block 47, an arm 49 carried by the pivot 48, and a feeler roller 50 mounted on the free end of the feeler arm 49 and freely rotatable about a pivot 51 secured in a housing 52. The arm 49 is under the action of a thrust spring 53 disposed in a sleeve 54 on the bracket 33 and which bears at one end against the arm 49 and at the other end against the sleeve 39. The relative position of the feeler arm 49 with respect to the bracket 33 is adjustable by means of a threaded shaft 55 threaded through a nut 56 welded on the block 47 and rotatable by a handwheel 57. A knurled nut 58 is provided for locking the shaft in a selected postion of adjustment.

Referring now to FIG. 6, the rotatable cutter has the cutter shaft 42, a lower clamping block 59 to seat on the shaft 42, a helical cutter blade 60, an upper clamping block 61, a washer 62, a centering sleeve 63 to seat within the two blocks and the blade, and a securing screw 64 to engage into a threaded bore 65 in the shaft 42. The blade is helical and accordingly one end 60a is axially offset from the other end 60b, the two blocks 59 and 61 being appropriate cut away to conform to the shaping of the blade.

The operation of the machine when used for tire siping is as follows:

A vehicle wheel with its tire is mounted on the shaft 5 and is adjusted so that its center line X-X' is substantially central in the support 1. With the mounting 15 in the non-operative position of FIG. 2, the handwheel 38 is rotated to shift the cutter assembly laterally until the axis of the cutter blade 60 is aligned with a first one of the usual several sections of tread which occur taken across the tire in order.

Then the latching lever 17 is released to permit the cutter to rest stationarily against the tire tread. The handwheel 28 is then rotated to adjust the position of the guide frame assembly 21 so as to place the axis of rotation of the cutter blade 60 at a true tangential position in relation to the circumference of the tire tread section. The handwheel 57 is then rotated to adjust the feeler arm 49 so that, with the feeler roller 50 resting firmly against the respective section of tread, the cutter blade will be tending to penetrate by a requisite amount into the tread section. In other words, adjustment of the handwheel 57 adjusts the radial depth of cut. The motor 44 is then switched on to cause the cutter blade to rotate and cut the tread section. Due to the helical nature of the cutter blade, at each time of rotation it pulls the tire around by a circumferential increment of movement corresponding to the degree of axial offset of the two edges of the cutter blade. Accordingly, as cutting proceeds, the tire rotates until the entire tread section has been cut. The motor is then switched off, and the handwheel 38 is operated to move the cutter assembly laterally until the cutter is aligned with the next tread section, again with adjustment of the tangential position and the cutting depth if desired. The motor is again energised to rotate the cutter and cut the section of tread. These operations are repeated until all the sections of tread have been cut. When the last section of tread has been cut, the motor is switched off, and the mounting 15 is pulled manually back to the non-operative position and is latched therein by the lever 17. The wheel and tire are removed, and a fresh wheel and tire can be inserted.

The feeler wheel 50 rides on the external surface of the tread section. As an alternative to this arrangement, the feeler wheel 50 may be replaced by a feeler finger 66 (see FIG. 5) which is adapted to ride on the surface of the tire in the usual circumferential gap between two adjacent sections of tread. This finger is mounted by a pivot 67 on the end of the modified feeler arm 49a.

A pipe 68 is mounted on the bracket 33 and has a jet nozzle 69 adjacent the cutter blade for supplying a lubricating liquid to the cutter. An inlet conduit union 70 for the liquid supply is provided on the support.

Figure 7:
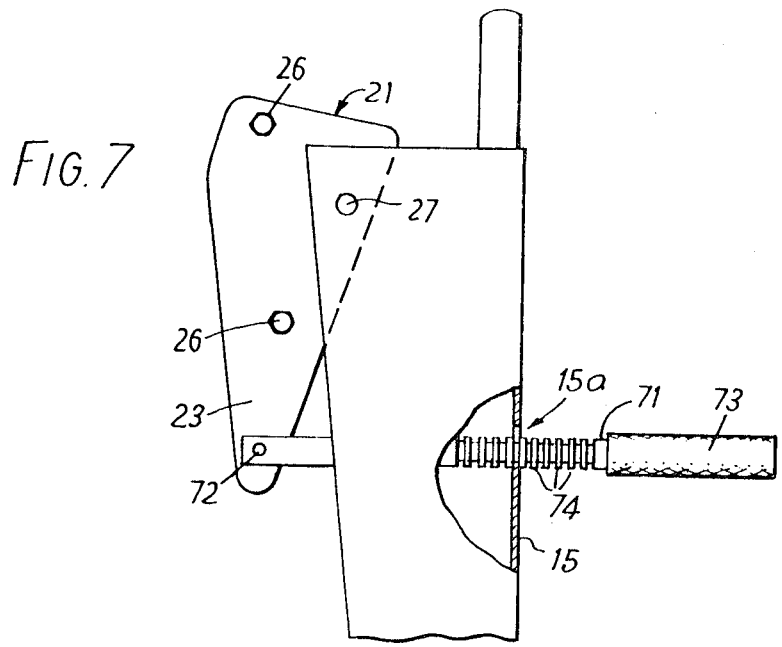
FIG. 7 is a partial side elevation to show details of an alternative arrangement for adjustment of the guide frame assembly with respect to the mounting.

Referring now to FIG. 7, there is shown an alternative arrangement for adjustment of the guide frame with respect to the mounting. The guideframe 21 is mounted by the pivot 27 on the mounting 15. In the mounting there is an aperture 15a through which is engaged a rod 71 which is connected at one end by a pivot pin 72 to the lower end portion of the side plate 23 of the frame 21. The other end of the rod has a handgrip 73. Along part of its length, the rod 71 has spaced flanges 74 the axial spacing of which is sufficient to permit insertion of the material of the wall of the mounting 15. Accordingly, by a simple lifting of the handle 73, and then pulling or pushing, and then lowering the handle again, the rod 71 can be adjusted through the aperture 15a and then locked again in the selected position.

Figure 8:
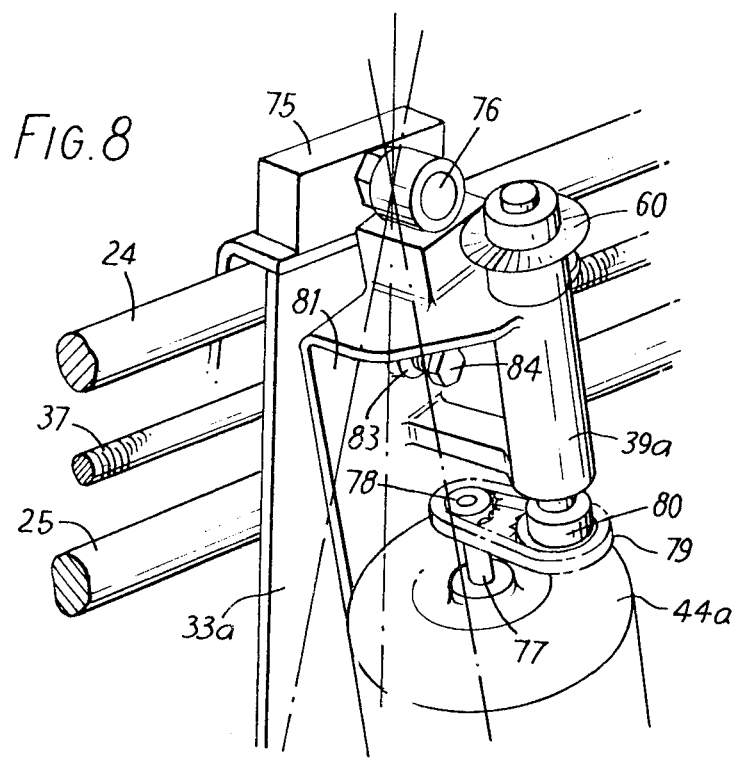
FIG. 8 is a partial perspective view from above and one side to show details of an alternative form of mounting of the siping cutter and its drive motor on the bracket, to permit lateral pivoting of the cutter to 15° to each side of vertical.

Referring now to FIG. 8, there is shown an alternative form of mounting of the siping cutter and its drive motor on the bracket. On the modified bracket 33a there is provided a block 75 carrying a horizontal pivot lug 76. The siping cutter motor 44a has an output shaft 77 carrying a sprocket 78, and the helical cutter blade 60 of the siping cutter journalled in the sleeve 39a is on a shaft having another sprocket 80, a chain 79 being engaged about the sprockets 78 and 80. The motor 44a and sleeve 39a are secured on a frame 81 which has at its upper end a sleeve 82 engaged on the lug 76 to form a pivot. On the frame 81 there is welded a nut 83 in which is threaded a bolt 84 which can be threaded inwardly, through the frame 81, to engage into any selected one of three holes (not visible) in the bracket 33a, thereby to lock the frame 81 in vertical position, or at 15° to each side of vertical, with respect to the bracket 33a. This permits formation of siping cuts at an angle of 15° to the radial plane containing the axis of rotation of the tire, as well as in that plane.

Figure 9:
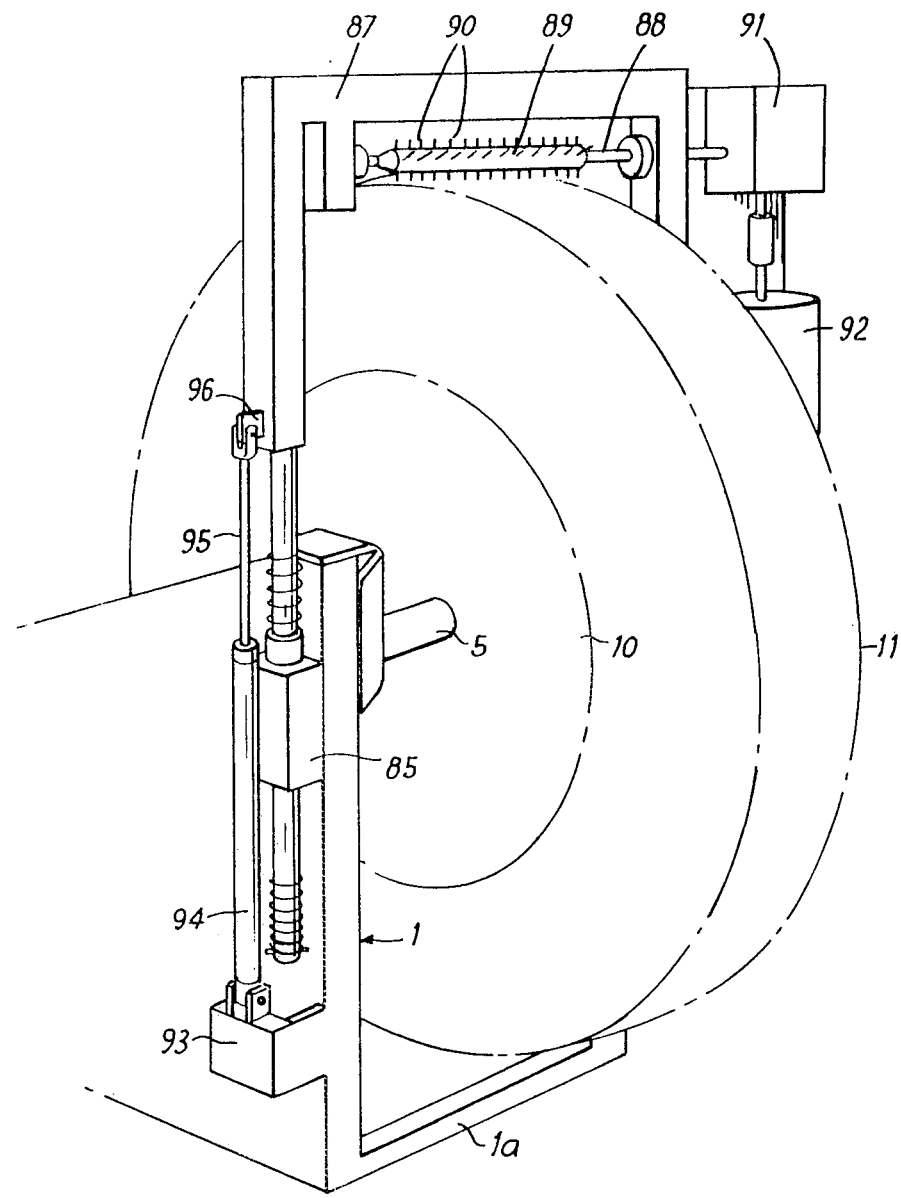
FIG. 9 is a partial perspective elevation to show details of means for direct drive engagement of the tire when the circumferential groove cutter is to be used on the tire.

Referring now to FIG. 9, there are shown details of a means for direct drive of the tire when the grooving cutter is to be used.

At an end of the support 1, on each of the side walls 2, 3 there is mounted a slide block 85 in which is vertically slidable a rod 86, the two rods carrying at their upper end an inverted U-shaped frame 87. In the frame 87 there is journalled a transverse drive shaft 88 which has an integral roller portion 89 with radial spikes 90 adapted to bite into the tread of the tire 11 and give positive drive engagement. The shaft 88 is connected through a speed reduction gear box 91 to an electrical drive motor 92. On each side wall 2, 3, there is mounted a bracket 93 on which is coupled a cylinder 94 of a hydraulic or pneumatic ram, the piston rod 95 of the ram being connected to a lug 96 on the frame 87. The cylinders 94 of the rams at each side of the machine are coupled by common piping (not shown) to a conventional hand-operable pump, with release valving. Coiled springs 97 are provided on the rod 86, above and below the block 85 to reduce shock when the rams reach the ends of their stroke. When the machine is being used for siping, the rams are actuated to maintain the frame 87 at an increased height such that the spikes 90 are clear of the tire tread. When the machine is to be used for cutting of circumferential grooves, using the U-shaped cutter seen in FIGS. 10 and 11, the rams are actuated to permit lowering of the frame 87 to give positive drive between the spiked roller 89 and the tread of the tire.

Figure 10:
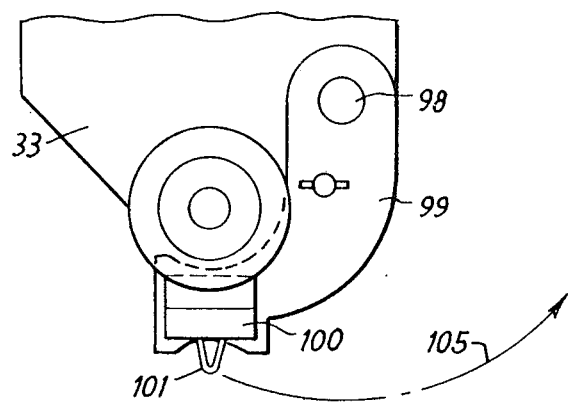
FIG. 10 is a partial plan view of the siping cutter assembly and also of a U-shaped groove cutter, the latter being in its position of use presented towards the tire.
Figure 11:
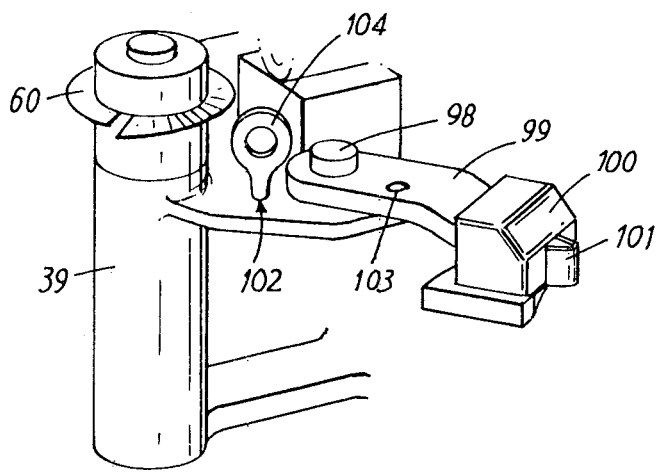
FIG. 11 is a partial perspective view of the same parts as are seen in FIG. 10, to show the groove cutter swung away to an inoperative position.

Referring now to FIGS. 10 and 11, there are shown details of the siping cutter assembly and also of the U-shaped cutter for cutting circumferential grooves in the tire tread.

On the bracket 33, or equally on the frame 81 of FIG. 8, there is provided a pivot pin 98 which carries a curved arm 99 having at its free end a block 100 in which is secured a U-shaped cutter blade 10. In the bracket 33, or frame 81, and in the arm 99, there are provided holes 102 which, when aligned, can receive a locking pin 104. In the position shown in FIG. 10, the arm is swung into the position in which the cutter blade 101 is positioned radially in front of the helical siping cutter blade 60, that is to say, the cutter element 101 lies between the siping cutter and the tread of the tire. When it is desired to place the groove cutter 101 out of use, and to use instead the siping cutter, the locking pin 104 is withdrawn, and the arm 99 is swung in the direction of the arrow 105 to the position of FIG. 11. The siping cutter is then exposed towards the tread of the tire.

Referring now to FIG. 12, there is shown a modified form of releasable and lockable mounting for the shaft carrying the tired wheel. In this arrangement, the side walls 2, 3, of the support 1 each have secured thereon a vertical plate 106 on which three roller bearing assemblies 107 are mounted in fixed positions. On the plate 106 there is provided a pivot pin 108 on which is journalled a lever 109 having a handle 110. The lever 109 carries a fourth roller bearing assembly 111 which is so disposed, in relation to the pivot pin 108 and the other three bearings 107 that it can be moved, from the disengaged position shown in full line in FIG. 12, in the direction of the arrow 112 until the bearing assembly 111 occupies the position 111a, in which position the shaft 5 carrying the wheel and tire then becomes locked within the zone bounded by the periphery of the four roller bearing assemblies. As the center line of the bearing assembly 111, in the position 111a, has moved beyond the line 113, there is an "over center" situation which prevents inadvertent unlocking of the system, unless the handle 110 is operated. It will be appreciated that the mechanism described is provided in mirror image symmetry on both side walls 2,3.

Referring now to FIG. 13, there is shown a ramp used for facilitating mounting of the tired wheel in the machine. The ramp comprises a body 114 having a transverse shaft 115 supporting a runway 116. To facilitate loading of the wheel and tire into the machine, the ramp is placed with the end 116a of the runway overlying a cross-member 1a of the support. The wheel and tire are run manually up the inclined runway, and when the load passes over the shaft 115, the runaway tilts until the end 116a lies on the cross-member 1a, i.e. approximately horizontal. The wheel and tire can then be wheeled easily into the machine, and the shaft 5 engaged in its bearers, whereafter the ramp is withdrawn to the position shown in FIG. 13.

The term "siping" as used herein is to indicate the formation of a shallow cut or slash laterally of the tread and a satisfactory siping of a tire is accomplished by forming about eight shallow slashes to the running inch, for example, in a tread section completely across the tread, but at a depth in the tread so that the cuts are almost invisible unless said tread is flexed.

When siped tires are used on a vehicle running on a dry road, the narrow rubber ribs of the tread between the siper slashes therein easily buckle and flex over sharp bumps and pits with less strain on the tire sidewalls so that the tire carcass life is extended. When the siped tires are used on ice or rain-slick roads, the tread bends at each tiny slash formed by the siping, forming a saw-toothed surface or squeegee-edged rubber ribs, which gives enhanced traction.

Also a siped tire resists skidding and jack knifing on fast stops of the vehicle as each rubber rib of the crosscut tread bends back and its squeegee-shaped edge grabs the road.

I claim:
1. A machine, for cutting circumferential grooves in a tire tread, which comprises:
  (i) a support;
  (ii) means on said support for supporting a tire rotatable about an axis, said means comprising a shaft having a hub to receive the tire, and means on said support releasably locking said shaft in an operative position on said support;
  (iii) a mounting carried by said support, said mounting and said tire support means being movable relatively towards and away from each other radially of said axis;

(iv) a cutter on said mounting;

(v) drive means to act between said support and said tire for rotating said tire relative to the cutter.

2. A machine, as claimed in claim 1, including means on said support for releasably latching said mounting in a non-operative position.

3. A machine, as claimed in claim 1, wherein said cutter is a siping cutter rotatable about an axis which is tangential to the periphery of the tire.

4. A machine, as claimed in claim 3, further comprising a groove cutter on said mounting.

5. A machine, as claimed in claim 4, wherein said groove cutter is carried by an arm secured to a pivot on said mounting, said arm being movable about said pivot into an operative position in which said groove cutter is disposed between said rotatable siping cutter and the tire supporting means, and into a non-operative position in which said groove cutter is removed from between said rotatable siping cutter and the tire supporting means.

* * * * *